US006938127B2

(12) United States Patent
Fletcher et al.

(10) Patent No.: US 6,938,127 B2
(45) Date of Patent: Aug. 30, 2005

(54) RECONFIGURING MEMORY TO REDUCE BOOT TIME

(75) Inventors: Terry M. Fletcher, Sacramento, CA (US); William A. Stevens, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 09/962,906

(22) Filed: Sep. 25, 2001

(65) Prior Publication Data

US 2003/0061531 A1 Mar. 27, 2003

(51) Int. Cl.[7] .................................................. G06F 13/28

(52) U.S. Cl. ........................ 711/141; 711/142; 711/143; 711/144; 711/154; 711/155; 711/170; 711/171

(58) Field of Search .......................... 711/141–144, 154, 711/155, 170–172, 158

(56) References Cited

U.S. PATENT DOCUMENTS 6,223,258 B1 * 4/2001 Palanca et al. ............. 711/138
6,334,171 B1 * 12/2001 Hill et al. .................... 711/138
6,411,302 B1 * 6/2002 Chiraz ......................... 345/545
6,581,148 B1 * 6/2003 Sadashivaiah et al. ...... 711/170
6,678,807 B2 * 1/2004 Thatcher et al. ............ 711/154

* cited by examiner

*Primary Examiner*—T Nguyen
(74) *Attorney, Agent, or Firm*—Ioni D. Stutman-Horn

(57) ABSTRACT

A processor-based system includes a system firmware program that is transferred to a designated region of a memory in response to an initialization (e.g., a boot sequence). When initialized, for example using at least one programmable register, the system firmware program reconfigures the memory from a first configuration (i.e., a default state) to a second configuration to receive a pattern. By changing the memory to the second configuration, the memory may be declared to be a write combining type. For storage into the memory, the pattern may be buffered in one or more data blocks. Once the pattern is stored, the memory may be restored to the first configuration. Buffered data transfers of the pattern may selectively clear the memory thus providing a rapid booting of the processor-based system.

23 Claims, 6 Drawing Sheets

RECONFIGURING MEMORY TO REDUCE BOOT TIME

BACKGROUND

This application relates generally to initialization of a processor-based system from a system firmware program, such as a basic input output system (BIOS), and more particularly, reconfiguration of a memory to reduce boot time in computing platforms incorporating a variety of different underlying processor architectures.

For proper initialization, most processor-based systems include a program or code generally known as a basic input output system (BIOS). The BIOS is typically stored on the motherboard as firmware, either in a read-only memory (ROM) or a flash device. Upon receiving power, the processor-based system begins executing instructions in the BIOS. Typically, the BIOS includes instructions for initializing the processor-based system following power-on or after a system reset. Initialization may include testing and initializing memory, a video display, a keyboard, a floppy drive, and so on. Following component initialization, the BIOS loads and runs an operating system (OS) program.

In computing systems, use of a cache memory with a processor is known to increase performance of processor architectures. Typically, a cache memory is used for rapidly loading data to the processor or storing data from the processor to a memory. For instance, the data that is required by the processor may be cached in the cache memory (or cache memories, such as several levels of cache memory L1, L2, and L3). While operating, a processor-based system including a computer system may employ such one or more levels of the cache memory.

Using the cache memory, among other things, the processor-based system transfers large amounts of data to and from a system memory to improve performance for a variety of applications, especially data-intensive applications. In doing so, one high performance processor architecture may support several memory types for the system memory. Examples of the memory types may include write back (WB), write through (WT), uncacheable speculative write combining (USWC), uncacheable (UC), and write protected (WP). Typically, the WB memory type is cacheable whereas the USWC and UC memory types are uncacheable.

In the majority of personal computers, before booting the OS program, all memory contents are overwritten to a default setting (e.g., conventionally to "0"). As the original personal computer (PC) platform from International Business Machines (IBM) of Armonk, N.Y. wrote all the memory contents to "0" before booting the operating system, this has been a de facto requirement of most of modem PCs. However, many modem operating systems do not require the system memory to be cleared, but it is still a requirement for a variety of computer systems, such as those containing error code checker (ECC) memory types where ECC data must be set to a default state before the system memory being used. This approach has remained unchanged for many years, and uses only features common to the 32-bit processor architectures, such as a 32-bit processor architecture with IA32 instruction set.

There are, however, inherent limitations in writing all the system memory contents to "0" before booting. In particular, while booting some platforms with conventional approaches, such as the 32-bit processor architecture with an IA32 instruction set, only 32-bit transfers of data to the system memory of uncacheable memory type may be possible, or even worse, write backs may be needed. That is, for every memory write that results in a cache miss (i.e., every single transfer when accessing the memory) the data will not only be written to the cache memory, but also a flush (write) back to the system memory of a whole cache line (4 to 16 quad-words, depending on the processor type) may be required as well.

Unfortunately, this is very inefficient and causes a perceivable delay to an end-user when booting a processor-based system. For most PC platforms using a BIOS, such perceivable reduction in boot time, however, may provide a competitive advantage to end-users.

Thus, there is a continuing need for a rapid booting mechanism for a processor-based system in a variety of computing platforms.

DETAILED DESCRIPTION

Figure 1:
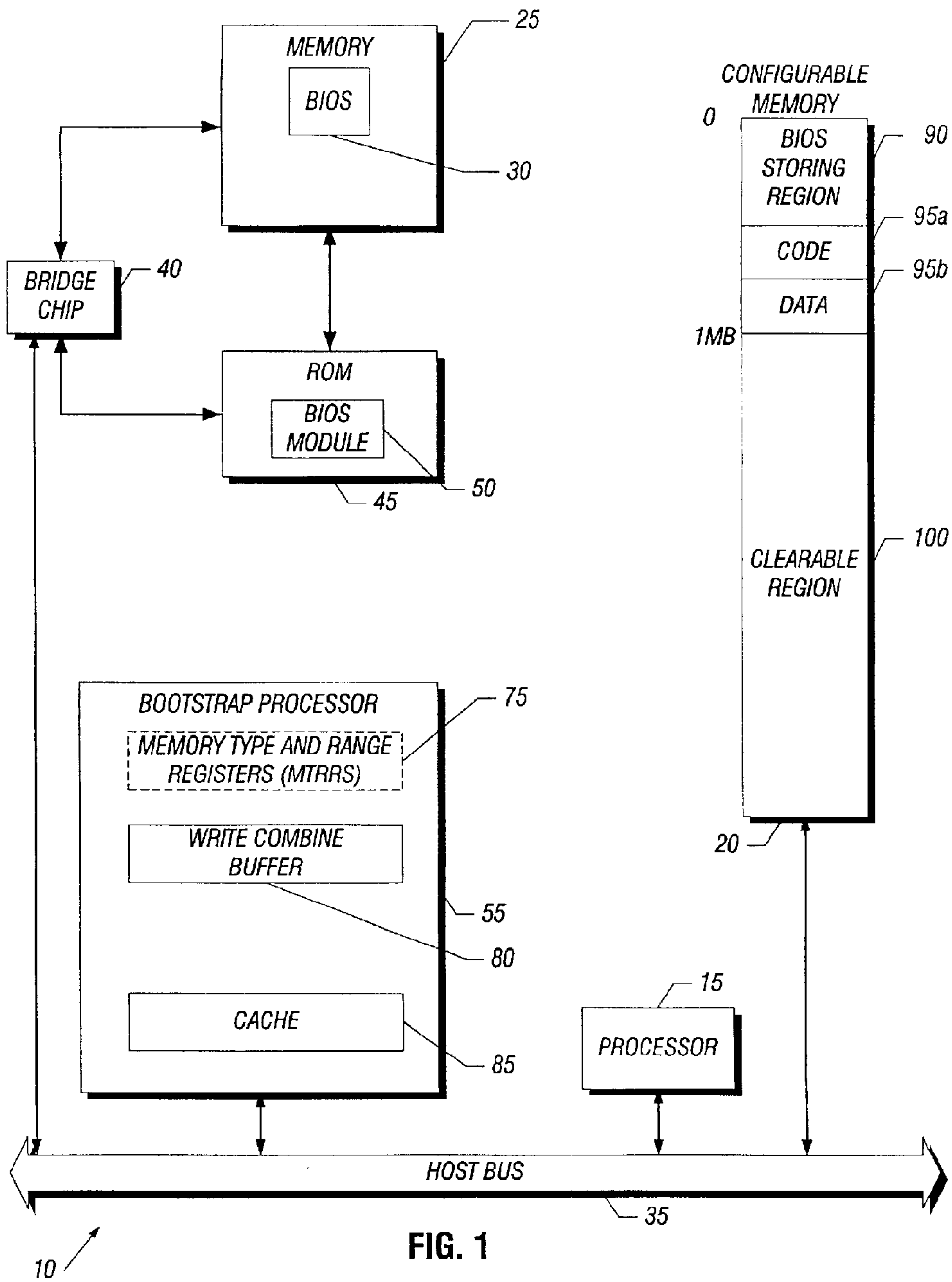
FIG. 1 is a block diagram of a processor-based system including a configurable memory, in accordance with one embodiment of the present invention.

A processor-based system 10 shown in FIG. 1 includes a processor 15 and a configurable memory 20 to enable a rapid initialization of the processor-based system 10 through a memory 25 storing a basic input output system (BIOS) firmware program 30, in accordance with one embodiment of the present invention. The memory 25 may be a reprogrammable memory such as a flash storage device in one embodiment. In some embodiments, the memory 25 may be any suitable storage media that is capable of storing program or code. The BIOS firmware program 30 may be platform-specific firmware or platform-independent software. Alternatively, the BIOS firmware program 30 may be any suitable initialization firmware or software that is executable program or code.

In one embodiment, the processor-based system 10 may comprise a host bus 35 coupled to both the processor 15 and the configurable memory 20. To controllably provide BIOS operations, the memory 25 may interface with the host bus 35 via a bridge chip 40 in one embodiment. Furthermore, a read-only-memory (ROM) 45 including a BIOS module 50 may be coupled to a bootstrap processor (BSP) 55 which may be coupled to the host bus 35. However, in some embodiments, the bootstrap processor 55 maybe the same as the processor 15.

According to one embodiment, the bootstrap processor 55 may support a set of programmable memory type and range registers (MTRRs) 75, one or more write combine buffers 80 and one or more caches 85. Likewise, the processor 15 may also include associated MTRRs, write combine buffers, and caches. Each of the processors, including the processor 15 and the bootstrap processor 55, may be a microprocessor, a microcontroller, or any suitable control device. The MTRRs 75 indicate to the bootstrap processor 55 the rules of conduct (i.e., the memory type) within various areas of the configurable memory 20. In one embodiment, the configurable memory 20 may include a BIOS storing region 90, a designated region for code **95*a*, a designated region for data 95*b* and a clearable region 100. The configurable memory 20** may be a static random access memory (SRAM), dynamic RAM (DRAM), or other suitable volatile media.

Once downloaded to the processor-based system 10, both the BIOS module 50 of the ROM 45 and the BIOS firmware program 30 of the memory 25 may be stored in the configurable memory 20. The BIOS firmware program 30 sets up the MTRRs 75 of the bootstrap processor 55 to reconfigure the configurable memory 20. Such reconfiguration of the memory type defines the rules of conduct throughout the memory space of the configurable memory 20 in one embodiment.

Essentially, the bootstrap processor 55 supports machine-specific MTRRs 75 that provide a caching mechanism incorporating reconfiguration of the configurable memory 20 from one to another memory type that allows the write combine buffers 80 to be used to combine smaller (or partial) writes automatically into larger burstable cache line writes. To set the memory type for a certain range of memory, the MTRRs 75 provide a mechanism for associating specific memory types with physical-address ranges in system memory (e.g., the configurable memory 20). For example, the MTRRs 75 may contain bit fields that indicate the processor's MTRR capabilities, including which memory types the bootstrap processor 55 supports, the number of variable MTRRs the bootstrap processor 55 supports, and whether the bootstrap processor 55 supports fixed MTRRs.

Figure 2:
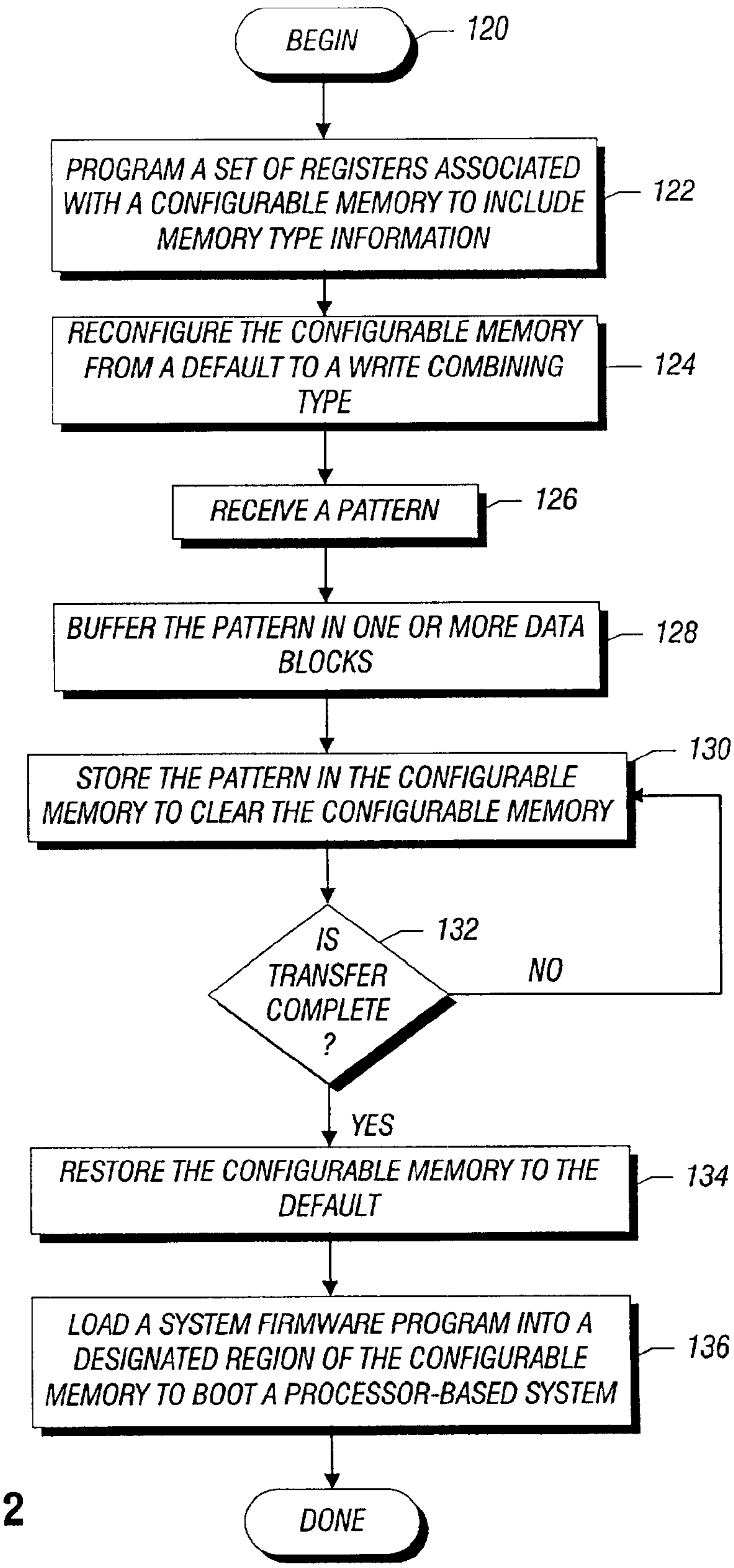
FIG. 2 is a flow chart for a system firmware program that may be employed to enable a rapid initialization for the processor-based system of FIG. 1 according to one embodiment of the present invention.

One operation for initializing the processor-based system of FIG. 1 from a system firmware program 120 (e.g., the BIOS firmware program 30) stored in the memory 25 is depicted in FIG. 2 according to one embodiment of the present invention. At some point during initialization, the system firmware program 120 accesses a set of programmable registers, such as the MTRRs 75 (FIG. 1) associated with the configurable memory 20 (FIG. 1) to include memory type information (block 122). By modifying the memory type information, the configurable memory 20 may be reconfigured from a default configuration to a write combining type configuration (block 124). For clearing the configurable memory 20, a pattern (e.g., a known pattern including a clear pattern) may be provided. When appropriately transferred, the pattern may be received (block 126) at the configurable memory 20. In order to store the pattern in the configurable memory 20, the pattern may be buffered in one or more data blocks (block 128). Finally, the data blocks of the pattern may be stored into the configurable memory 20 (block 130).

In one embodiment, the configurable memory 20 may be reconfigured as the write combining type by including a specific memory type information into at least one register of the MTRRs 75. The specific memory type information at least in part may be copied from at least one register of the MTRRs 75 into another register of the MTRRs 75. This specific memory type information may be used to declare the configurable memory 20 as the write combining type. In response to an initialization, the configurable memory 20 may be converted from the default configuration to the write combining type configuration. In one case, the initialization includes booting of the processor-based system 10 (FIG. 1) upon powering up.

To clear the configurable memory 20, a clear pattern may be provided into the data blocks over the host bus 35 as shown in FIG. 1 that carries data across a fixed bus width. The data blocks may be sized to match the fixed bus width in one embodiment. Defining of the configurable memory 20 as the write combining type allows for speculative reads with weak ordering of the data blocks.

According to one embodiment, the data blocks may include quad-sized words to transfer the clear pattern in data units of size 64-bits over the host bus 35. Before initiating a booting sequence, the clear pattern may be loaded into the configurable memory 20 without caching the data blocks into the configurable memory 20. Then, the specific memory type information may be modified to restore the configurable memory 20 from the write combining type to the default configuration.

In one embodiment, while using the write combining type configuration for the configurable memory 20, the data blocks of the clear pattern will not be cached, as the bootstrap processor 55 employs the write combining buffers 80 to send one quad-word per clock. One embodiment of the present invention uses quad-word sized (i.e., 64-bit) transfers to match the transfer bandwidth to the width of the host bus 35 (rather than using two 32-bit transfers). Advantageously, such one 64-bit transfer per clock may thus be used in processor architectures including 64-bit processor architectures (e.g., Pentium® P6, IA64, Itanium® architectures from Intel® Corporation, Santa Clara, Calif. 95052) with configurable memory type attributes that allow high "Processor to Memory" path write bandwidths.

While writing the clear pattern to the configurable memory 20, the system firmware program 120 determines whether the clear pattern is completely transferred to the configurable memory 20. A check at the diamond 132 indicates whether the transfer of the clear pattern is completed. If the check is affirmative, the configurable memory 20 may be restored to the default configuration (block 134). Conversely, if the check fails, transferring of the system firmware program 120 continues until completely copied to the configurable memory 20 or some unforeseeable event occurs during such transfer. In this way, the system firmware program 120 may be loaded into the BIOS storing region 90 (FIG. 1) of the configurable memory 20 after storing the clear pattern into the configurable memory 20 (block 136). Thus, write combined transfers may enable the processor-based system 10 to rapidly boot when properly initialized.

As described, the write combined transfers are weakly-ordered data transfers that can be executed out of order, i.e., a m-th sequential transfer in a program may be executed before a (m-n)-th sequential transfer (where m and n are positive whole numbers and m>n). On the other hand, strongly ordered transfers are data transfers that are executed in a fixed order. For example, in one embodiment, a write combine transfer includes a line of data comprising 32 bytes of data, as utilized in 32-bit microprocessor-based systems. However, a line of data comprising other than 32 bytes of data is also within the scope of the present invention.

Generally, a cache "hit" occurs when the address of an incoming transfer matches one of the valid entries in the cache 85 as shown in FIG. 1. Likewise, a cache "miss" occurs when the address of an incoming transfer does not match any valid entries in the cache 85. For the purposes of the write combined transfers, write combining is the process of combining writes to the same line in a buffer (e.g., the write combine buffer 85), therefore diminishing the number of the host bus 35 transactions required.

In one embodiment, the bootstrap processor 55 supports five memory types including write back (WB), write through (WT), uncacheable speculative write combining (USWC), uncacheable (UC), and write protected (WP). Also, the loads and stores, which are dispatched to the configurable memory 20, have an associated memory type.

The WB memory type is cacheable whereas the USWC and UC memory types are uncacheable. The WP writes are uncacheable, but the WP reads are cacheable. The WT reads are also cacheable. The WT writes that "hit" the cache 85 update both the cache 85 and the configurable memory 20, whereas the WT writes that "miss" the cache 85 only update the configurable memory 20. The USWC writes are weakly ordered, which means that subsequent write combine transfers may execute out of order with respect to a USWC write or the USWC write may execute out of order with respect to previous transfers. On the other hand, the UC stores are strongly ordered, and they execute in program order with respect to other stores.

Once a memory region has been defined as having the USWC memory type, accesses into the memory region will be subject to the architectural definition of USWC. As the USWC is a weakly ordered memory type, the configurable memory 20 locations are not cached, coherency is not enforced, and speculative reads are allowed. In this way, the writes may be delayed and combined in the write combining buffer 80 to reduce memory accesses. In the following description, for purposes of explanation, numerous details are set forth in order to provide a thorough understanding of the present invention. However, it will be apparent to one skilled in the art that these specific details may not be necessarily required in order to practice the present invention.

Figure 3:
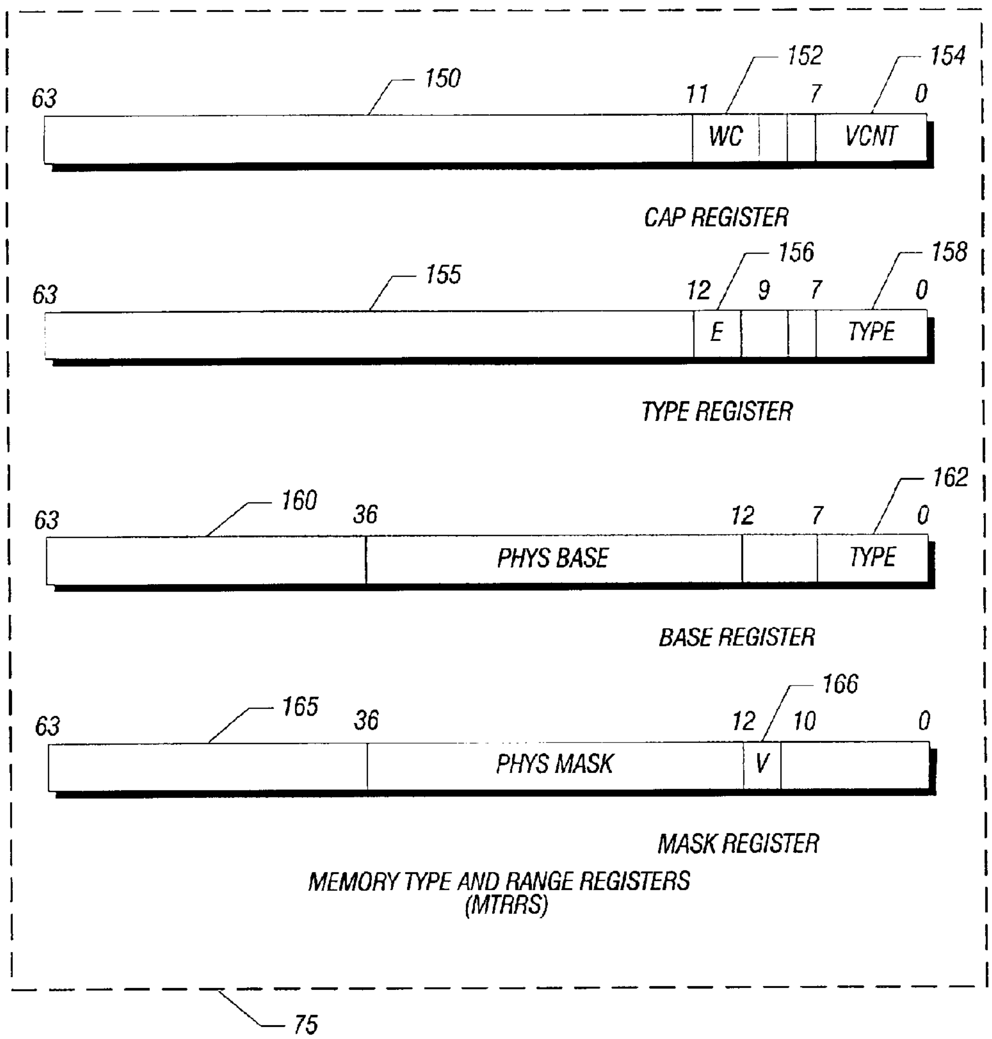
FIG. 3 is a schematic depiction of a set of programmable registers associated with the configurable memory of FIG. 1 in a processor architecture according to one embodiment of the present invention.

For a processor architecture, a schematic depiction of a set of programmable registers (e.g., MTRRs 75 of FIG. 1) associated with the configurable memory 20 of FIG. 1 is shown in FIG. 3 according to one embodiment of the present invention. As shown in FIG. 3, the MTRRs 75 (FIG. 1) may include a cap register 150, a type register 155, a base register 160, and a mask register 165.

The cap register 150 indicates the availability of various registers of the MTRRs 75 on the bootstrap processor 55. The type register 155 defines the memory type for regions of the configurable memory 20 not covered by the currently enabled MTRRs 75 (or for all of the configurable memory 20 if the MTRRs 75 were disabled). The base register 160 may be used to set the base address of the memory region whose memory type is defined. The mask register 165 may be employed to define the size of the physical memory range in the configurable memory 20 that is to be reconfigured.

In one embodiment, the cap register 150 includes a write combining (WC) bit field 152 to indicate whether the USWC memory type is supported or not. For example, when the WC bit field 152 is set to "0" this indicates that USWC memory type is not supported. Conversely, setting of the WC bit field 152 to "1" indicates that USWC memory type is indeed supported. The cap register 150 further includes a variable count (VCNT) bit field 154 to indicate the number of variable-range MTRRs that are supported. Of course, other bit fields of the MTRRs 75 may also be suitably manipulated to provide other initialization-related operations that may be platform or processor architecture specific.

In one case, the type register 155 includes an enable (E) bit field 156 to either enable or disable the MTRRs 75. The type register 155 further includes a type bit field 158 to indicate the memory type including, write back (WB), write through (WT), write combining (USWC), uncacheable (UC), and write protected (WP). In operation, a reset clears the type register 155, disabling all the MTRRs 75 and defining all of the configurable memory 20 as the uncacheable (UC) type. Setting the E bit field 156 to "0" indicates that all the MTRRs 75 are disabled. Conversely, setting the E bit field 156 to "1" indicates that all variable-range MTRRs 75 are enabled. Additionally, however, other bit fields of the MTRRs 75 may also be appropriately manipulated to provide various initialization associated operations.

Further, as shown in FIG. 3, each variable-range register may comprise a register pair such as the base register 160 and the mask register 165. The format of both the registers 160 and 165 is illustrated in FIG. 3 according to one embodiment. For example, in this case, the base register 160 may include an associated type bit field 162 and the mask register 165 may include a valid/invalid (V) bit field 166 to indicate whether the register pair includes valid or invalid values.

In one embodiment, the MTRRs 75 allow up to 96 memory ranges to be defined in physical memory (e.g., the configurable memory 20) and defines a set of model-specific registers (MSR) for specifying the type of memory that is contained in each range. The memory ranges and the types of memory specified in each range are set by three groups of registers: the type register 155 (e.g. MTRRdefType register of Intel® Pentium® and Intel® Itanium® system architectures), the fixed-range MTRRs, and the variable range MTRRs. These registers can be read and written using the read model-specific register (RDMSR) and write model-specific register (WRMSR) instructions, respectively.

Figure 4A:
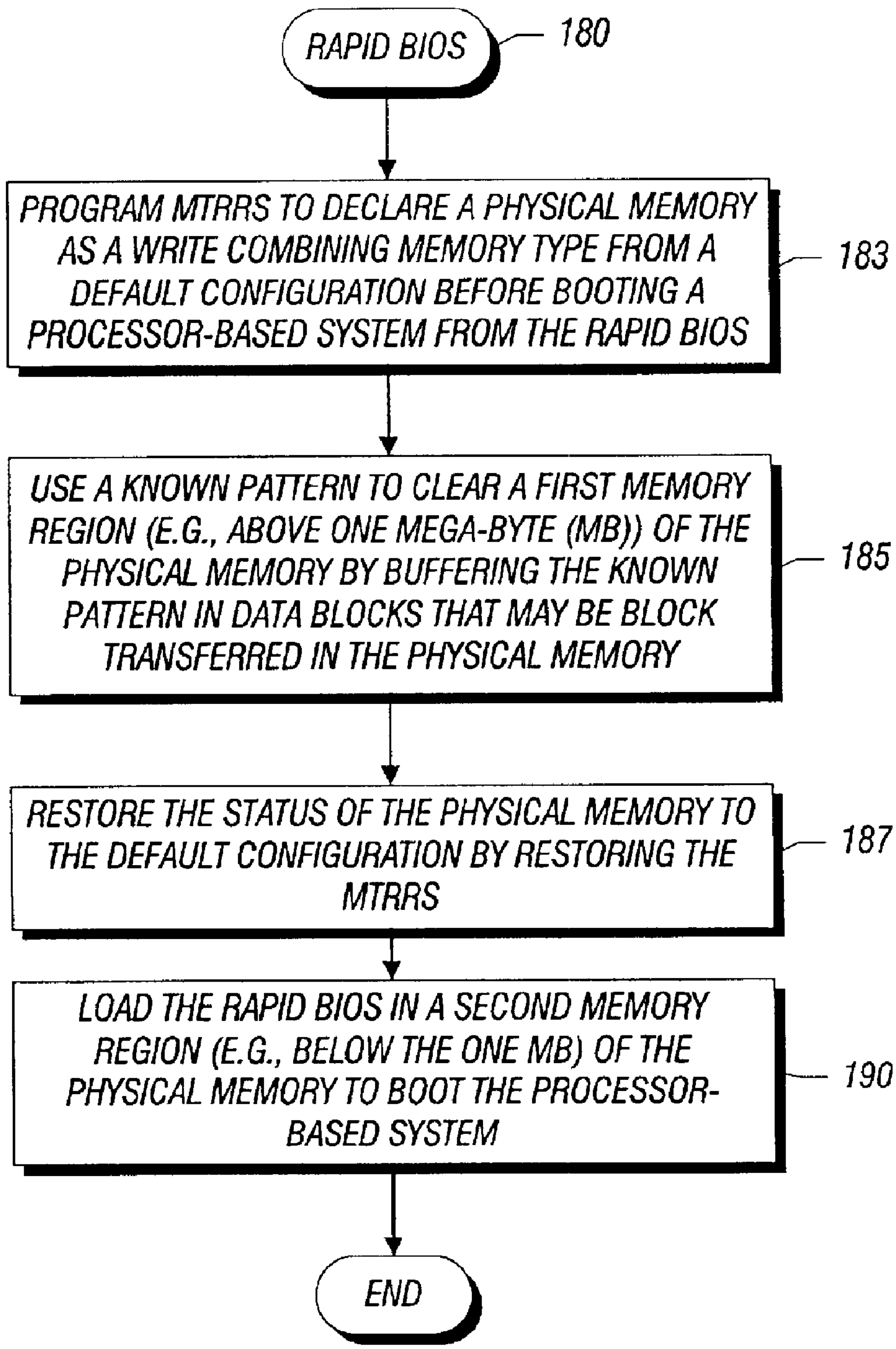
FIG. 4A is a flow chart for a rapid BIOS firmware program that may boot the processor-based system of FIG. 1 using the set of programmable registers of FIG. 3 according to one embodiment of the present invention.

One operation for reconfiguring the configurable memory 20 of FIG. 1 from a rapid BIOS firmware program 180 is depicted in FIG. 4A. The rapid BIOS firmware program 180 may be employed for the processor-based system 10 of FIG. 1 using the set of programmable registers (e.g., MTRRs 75) of FIG. 3 according to one embodiment of the present invention. Before booting the processor-based system 10, the MTRRs 75 may be programmed to declare the configurable memory 20 as a write combining type, i.e., the USWC memory type from a default configuration (block 183).

In one embodiment, a known pattern may be used to clear a first memory region (e.g., above 1 mega-byte (MB)) of the configurable memory 20 by buffering the known pattern in one or more data blocks. This way, the known pattern may be block transferred into the configurable memory 20 via the data blocks (block 185). Once stored, the status of the configurable memory 20 may be restored to the default configuration by restoring the MTRRs 75 (block 187) in one embodiment. In order to continue the booting process for the processor-based system 10, the rapid BIOS firmware program 180 may be loaded in a second memory region (e.g., below the 1 MB region) of the configurable memory 20 (block 190).

Figure 4B:
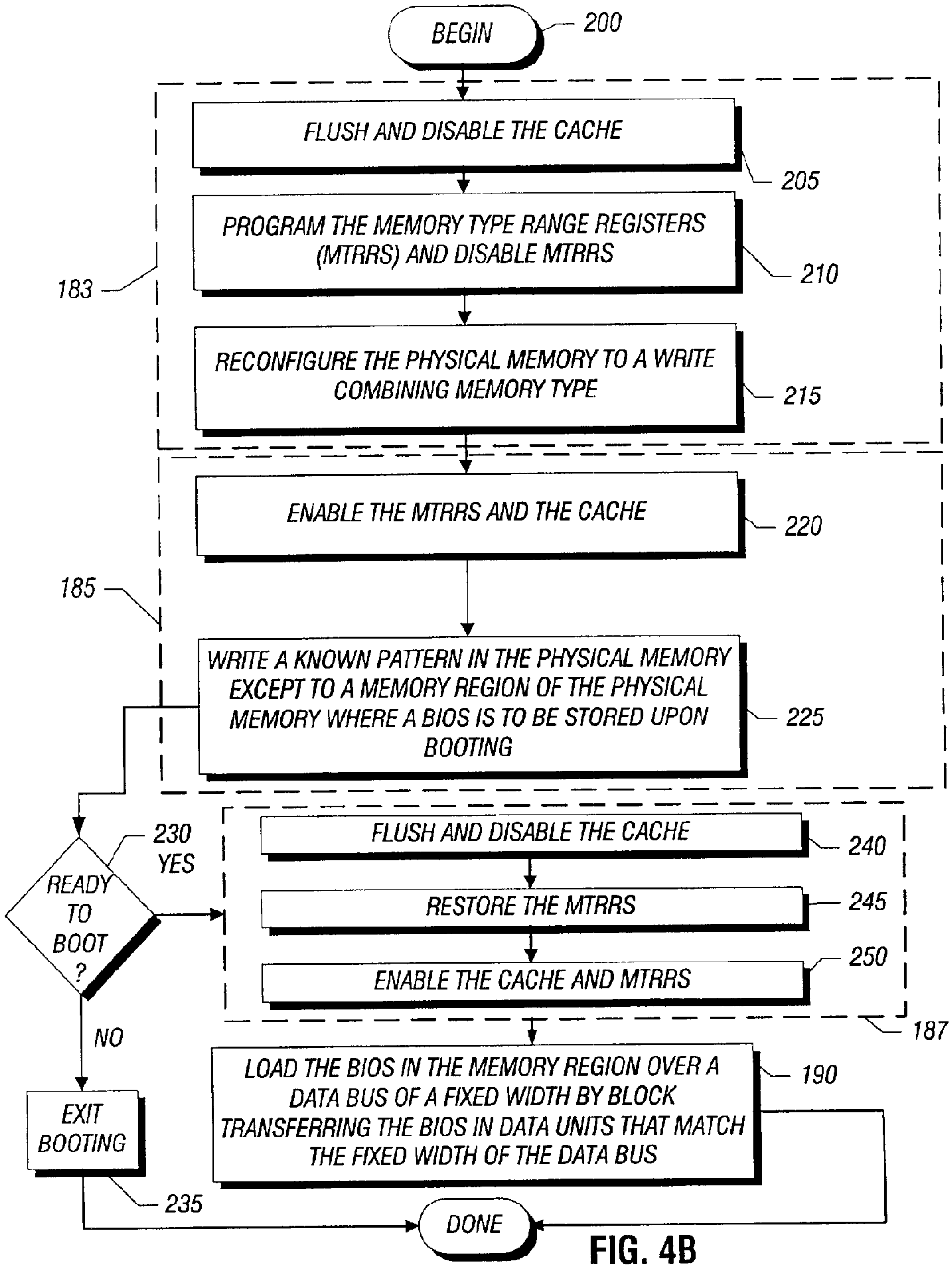
FIG. 4B is a detailed flow chart for the rapid BIOS firmware program of FIG. 4A according to one embodiment of the present invention.

Another operation to reconfigure the configurable memory 20 (FIG. 1) for a booting sequence 200 incorporating the rapid BIOS firmware program 180 of FIG. 4A is depicted in FIG. 4B. In accordance with one embodiment of the present invention, the booting sequence 200 in conjunction with the rapid BIOS firmware program 180 may use the set of programmable registers (e.g., MTRRs 75 of FIG. 1) of FIG. 3 for initializing the processor-based system 10 of FIG. 1.

More particularly, the cache 85 (FIG. 1) associated with the configurable memory 20 (FIG. 1) may be flushed and disabled (block 205). The MTRRs 75 may be first programmed and subsequently disabled (block 210). By selectively setting a particular field or bit of at least one register (for example) of the MTRRs 75, the memory type of the configurable memory 20 may be reconfigured. In one case, the memory region above the 1 MB (of the configurable memory 20) may be set to an uncacheable speculative write combining (USWC) memory type, as an example (block 215). Then, the MTRRs 75 and the cache 85 may be enabled (block 220). A known pattern (e.g., a clear pattern) may be written in the configurable memory 20 except to a memory region where the rapid BIOS firmware program 180 (FIG. 3) is to be stored upon booting of the processor-based system 10 (block 225).

A check at the diamond 230 indicates whether the processor-based system 10 is ready to boot. If the check is affirmative, the cache 85 may be flushed and disabled (block 240) before restoring the MTRRs 75 (block 245). Then, the MTRRs 75 and the cache 85 may be enabled (block 250). Conversely, if the check fails, the processor-based system 10 exits booting without loading the rapid BIOS firmware program 180 (block 235). In one embodiment, the rapid BIOS firmware program 180 as shown in FIG. 4A, is loaded in the memory region (e.g., below the 1 MB of the configurable memory 20) over the host bus 35 (FIG. 1) of a fixed width. The rapid BIOS firmware program 180 may be block transferred in data units that match the fixed width of the host bus 35.

Detailed description of the MTRRs 75 and specific bit field definitions can be found in the Intel® Pentium® and Intel® Itanium® system Datasheets available from Intel® Corporation, Santa Clara, Calif. 95052. There are, however, many different ways the MTTRs 75 may be devised and programmed to accomplish this. In the following, according to one embodiment, pseudo-code as a high-level algorithm that relies upon the MTRRs 75 (FIG. 1) associated with the Intel® Pentium® and Intel® Itanium® system architectures is contemplated. The pseudo-code example assumes a single BSP active processor (e.g., the bootstrap processor (BSP) 55 (FIG. 1)) with the code 95*a* (FIG. 1) and the data 95*b* (FIG. 1) being located below the 1 MB memory region of the configurable memory 20 whose cacheability is controlled by the fixed MTRRs 75. The memory region to be cleared is above 1 MB memory region, i.e., the clearable region 100 (FIG. 1), which is consistent with a configuration for the rapid BIOS firmware program 180 (FIG. 4A) executing in "big-real mode" according to one embodiment of the present invention.

Normally, the ROM 45 as shown in FIG. 1, during power-on may not access an extended memory portion of the configurable memory 20. Instead, the extended memory portion is accessible once the operating system has been loaded and executed. The extended memory portion may be accessed during power-on if the ROM 45 goes into a protected mode. Once in the protected mode, code that is stored in the extended memory portion may be executed. Upon completion of the execution, control returns to the ROM 45 and the system ROM returns to real mode. Alternatively, the ROM 45 may enter the "big-real mode." Such big-real mode allows the ROM 45 to access data in the extended memory portion without having to go into the protected mode.

As described earlier, when present and enabled, the MTRRs 75 in the bootstrap processor 55 define the rules of conduct, i.e., the memory type of the configurable memory 20 including, the 1 MB memory region. Upon execution, in one embodiment, a write back and invalidate cache (WBINVD) instruction followed by a write to the MTRRs 75 (FIG. 3) at the register CR0 with a clear data (CD) bit set to "1," the cache 85 (FIG. 1) may be flushed and disabled before modifying the MTRRs 75. As a result of the assertion of a RESET signal to the bootstrap processor 55, the register CR0 may contain data indicating a particular mode including the "big-real mode."

In one embodiment, the WBINVD instruction enables write backs and flushes the cache 85 and initiates writing-back and flushing of any external caches. Specifically, it writes back all modified cache lines in the bootstrap processor's 55 internal cache 85 to the physical, main or system memory, i.e., the configurable memory 20 and invalidates (flushes) the cache 85. In one embodiment, the WBINVD instruction then issues a special-function bus cycle that directs external caches to also write back modified data and another bus cycle to indicate that the external caches ideally may be invalidated as well.

After executing this instruction, the bootstrap processor 55 may not wait for the external caches to complete their write-back and flushing operations before proceeding with instruction execution, i.e., it is the responsibility of hardware to respond to the cache write-back and flush signals. The details of the WBINVD instruction are included in The Intel® Architecture Software Developer's Manual, Volume 3, which is available from The Intel® Corporation, Santa Clara, Calif. 95052. However, the WBINVD instruction may be suitably implemented differently for various processor architectures.

In operation, the original contents of the type register 155 (FIG. 3) may be stored into another corresponding register referred to as an old MTRR type register. Then, to disable the MTRRs 75, a "0" may be written to the bit 11 of the type register 155. The number of variable MTRRs 75 may be indicated in bits (7:0) of the cap register 150 as the VCNT. Iteratively, as example, for "N" number of the base and mask registers 160 and 165, 0 through VCNT-1, the contents of the base register 160 (FIG. 3) may be saved into another corresponding register referred to as an old MTRR base register.

Likewise, the contents of the mask register 165 (FIG. 3) may also be saved into another corresponding register referred to as an old MTRR mask register. Additionally, a variable MTRR may be invalidated by writing a "0" to the bit 11 of its mask register 165. Then, the variable MTRR may be set to "0" in order to set the memory region above 1 MB of the configurable memory 20 (FIG. 1) to USWC memory type.

For reconfiguring the configurable memory 20 (FIG. 1), the $0^{th}$ base register 160 may be set to 0 MB, and the $0^{th}$ mask register 165 may be set so that the mask sets all memory up to the top of the physical memory present (i.e., top of the configurable memory 20) as the USWC memory type. Then, the MTRRs 75 may be enabled by writing a "1" to bit 11 of the type register 155. Likewise, the cache 85 may be enabled by setting the CD bit to "0" in the register CR0. In one embodiment, to clear the configurable memory 20, a register such as an MMX register 0 may be loaded with a clear pattern in response to an instruction (e.g., MOVQ mm0, {pattern}). For each consecutive quad-word in the physical memory, i.e., the configurable memory 20, a special register such as the ESI register may be used in increments of 8 above 1 MB memory region. The clear pattern may be moved from "mm0" into the memory location in response to an instruction (e.g., MOVQ qword ptr [ESI], mm0).

According to one embodiment, prior to modifying the MTRRs 75, however, the cache 85 (FIG. 1) may be flushed and disabled as well. As described earlier, this may be accomplished by a WBINVD instruction followed by a write to the register CR0 with the CD bit set to "1." Then the bit 11 of the type register 155 may be cleared. Next, the contents of the old type register may be provided to the type register 155 in order to restore the type register 155. Iteratively, as example, for "N" number of the base and mask registers 160 and 165, 0 through VCNT-1, the contents of the base register 160 (FIG. 3) may be restored from the old MTRR base register. Likewise, the contents of the mask register 165 (FIG. 3) may also be restored from the old MTRR mask register. Moreover, the MTRRs 75 may be enabled by writing a "1" to the bit 11 of the type register 155. In addition, the cache 85 may be enabled by setting the CD bit to "0" in the CR0 register.

As shown in FIG. 1, in general, before invoking the BIOS firmware program 30, the bootstrap processor 55 executes a power-on self-test (POST) upon power-up or a reset, as examples. When appropriately initialized, system board devices may be configured and enabled. The presence of the other processors (e.g., if the processor 15 in addition to the bootstrap processor 55 is also provided) may be detected and a booting sequence may be performed to read an operating system (OS) into the configurable memory 20 and subsequently control may be passed to the OS from the BIOS firmware program 30. Thus, according to one embodiment of the present invention, a method and an apparatus executing a program such as a BIOS clears a system memory by using write combined transfers for reducing the boot time of a personal computing system.

Figure 5:
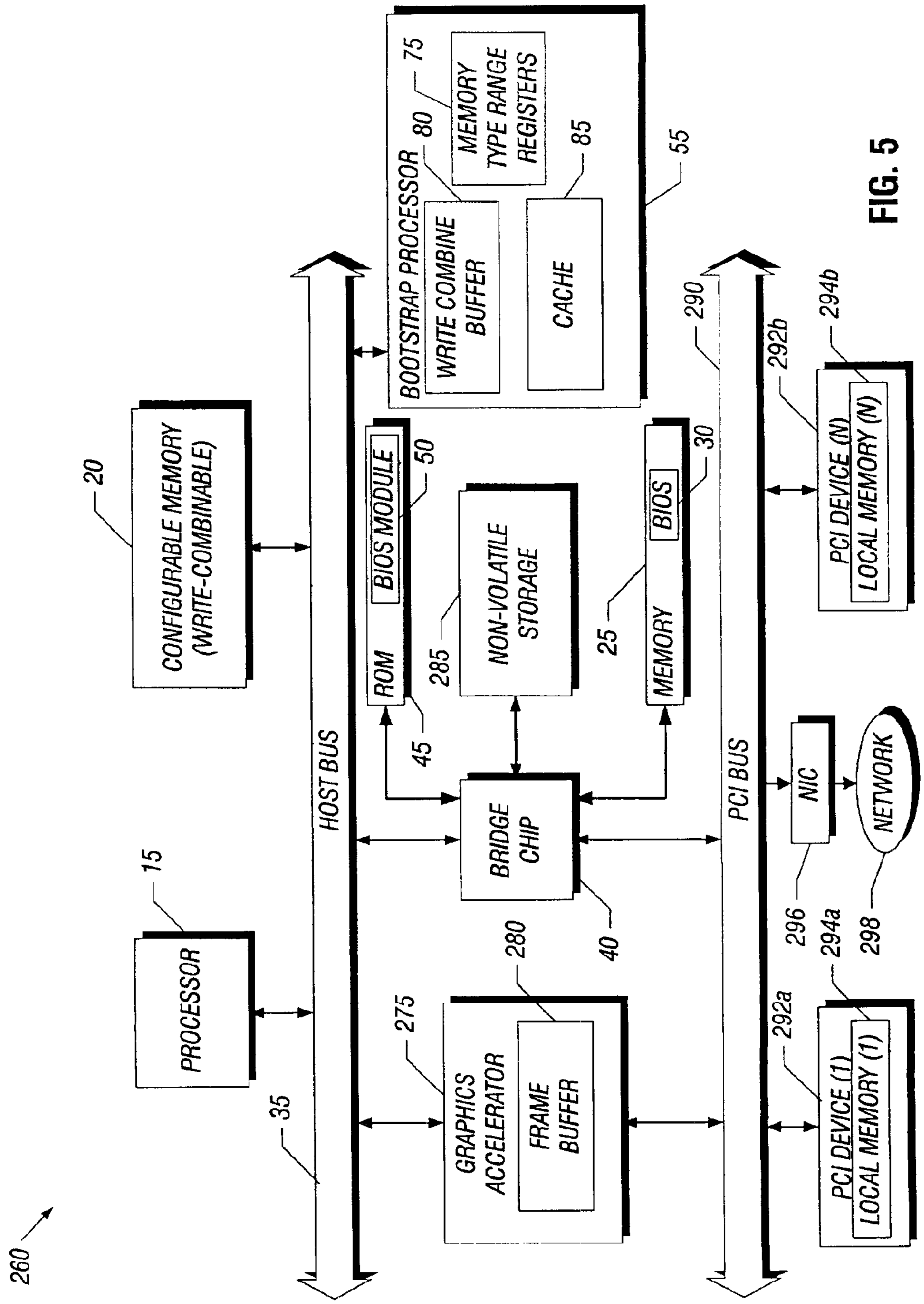
FIG. 5 is a block diagram of a personal computer (PC) platform including a write combining type memory and the rapid BIOS firmware program of FIGS. 4A and 4B to reduce boot time, in accordance with one embodiment of the present invention.

In FIG. 5, a block diagram illustrates a personal computer (PC) platform 260, in accordance with one embodiment of the present invention. By executing the rapid BIOS firmware program 180 (FIG. 3) that incorporates the features of FIGS. 4A and 4B, boot time of the PC platform 260 may be reduced in some embodiments. According to one embodiment, the PC platform 260 includes the processor 15 and the configurable memory 20 connected by the host bus 35. The bootstrap processor 55 further includes the MTRRs 75, the write combine buffer 80 and the cache 85. In the depicted PC platform 260, the configurable memory 20 is write combinable.

For operation and communication to and from the system board devices, the bridge chip 40 couples the host bus 35 to a peripheral component interconnect (PCI) bus 290. The PCI bus 290 is compliant with the PCI Local Bus Specification, Revision 2.2 (Jun. 8, 1998, available from the PCI Special Interest Group, Portland, Oreg. 97214). In one embodiment, the bridge chip 40 is a multi-function device, supporting the ROM 45, the memory 25, a non-volatile storage memory 285, and the boot strap processor 55 of FIG. 1. The BIOS module 50 and the BIOS firmware program 30 may be stored permanently in the non-volatile storage memory 285, such as a hard disk drive.

Furthermore, in one embodiment, the PC platform 260 comprises a graphics accelerator 275 including a frame buffer 280 that couples the system board devices to the host bus 35 via the PCI bus 290. For instance, a PCI device (1) 292*a* including a local memory (1) 294*a* through a PCI device (N) 292*b* including a local memory (N) 294*b* may be coupled to the PCI bus 290. Additionally, a network interface card (NIC) 296 is coupled to the PCI bus 290 for connecting the PC platform 260 to a network 298.

In some Intel® processor (e.g., the Intel® Pentium® and Intel® Itanium®) based PC platforms, different memory types may be supported where the memory type can be defined by programming the associated registers to indicate memory type and range, such as the MTRRs 75. Using a write-combinable memory type for the configurable memory 20, speculative reads with weak ordering may be provided. The writes to the write-combinable memory type can be buffered and combined in the bootstrap processor's 55 write-combining buffers such as, the write combine buffer 80. The write-combinable writes may result in cacheline transfers on the host bus 35 while allowing data streaming on the PCI bus 290. This is optimal for the frame buffer 280 write accesses and allows for significantly high throughput from the bootstrap processor 55 to the frame buffer 280. The PCI devices 292*a* and 292*b* can accommodate out-of-order transactions that may set their corresponding local memories 294*a* and 294*b*, respectively, as the write-combinable memory type to take advantage of bursting on the host and PCI buses 35 and 290.

Thus, an implementation of a rapid booting for a processor-based computing system from a BIOS firmware is disclosed according to several embodiments. The BIOS firmware stored in a computer system including a system memory that may be reconfigured into a write combining type. When the BIOS firmware is invoked, the system memory may be cleared by using write combined transfers of the BIOS firmware to the system memory to reduce the boot time while initializing the computer system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

reconfiguring a memory from a first configuration to a second configuration to receive a pattern;

buffering the pattern in one or more data blocks;

storing the one or more data blocks in the memory;

restoring the memory to the first configuration; and converting the memory from the first configuration to the second configuration in response to an initialization to boot a processor-based system.

2. The method of claim 1, including:

reconfiguring said memory to the second configuration that enables write combining;

selectively clearing said memory by storing the pattern in the memory; and loading a system firmware program into a designated region of the memory after restoring the memory to the first configuration.

3. The method of claim 2, including:

flushing and disabling one or more caches associated with the memory; and programming at least one register associated with the memory to include memory type information that declares said memory to be a write combining type memory.

4. The method of claim 3, including modifying the memory type information to change the memory from the second configuration to the first configuration after storing the pattern into the memory.

5. A method comprising:

reconfiguring a memory from a first configuration to a second configuration to receive a pattern;

buffering the pattern in one or more data blocks;

storing the one or more data blocks in the memory;

restoring the memory to the first configuration;

reconfiguring said memory to the second configuration that enables write combining;

selectively clearing said memory by storing the pattern in the memory;

loading a system firmware program into a designated region of the memory after restoring the memory to the first configuration;

flushing and disabling one or more caches associated with the memory;

programming at least one register associated with the memory to include memory type information that declares said memory to be a write combining type memory; and providing the one or more data blocks over a bus that carries data across a fixed bus width, said one or more data blocks are sized to match the fixed bus width, wherein the one or more data blocks includes quad-sized words to transfer said pattern in 64-bit data units over the bus.

6. The method of claim 5, including defining the memory as the write combining type memory to allow speculative reads with weak ordering of the one or more data blocks.

7. A method comprising:

reconfiguring a memory from a first configuration to a second configuration to receive a pattern;

buffering the pattern in one or more data blocks;

storing the one or more data blocks in the memory;

restoring the memory to the first configuration;

reconfiguring said memory to the second configuration that enables write combining;

selectively clearing said memory by storing the pattern in the memory;

loading a system firmware program into a designated region of the memory after restoring the memory to the first configuration;

flushing and disabling one or more caches associated with the memory;

programming at least one register associated with the memory to include memory type information that declares said memory to be a write combining type memory; and modifying the memory type information to change the memory from the second configuration to the first configuration after storing the pattern into the memory, wherein loading the system firmware program comprises:

initiating a booting sequence that copies at least in part the memory type information from the at least one register into another register;

loading the pattern in the memory without caching the one or more data blocks; and loading a basic input output system into the memory.

8. A method comprising:

configuring a memory to be a write combining type memory;

transferring initialization data to said memory;

reconfiguring the memory from the write combining type memory to a non-write combining type memory;

initiating a booting sequence that copies at least in part the memory type and range information from at least one register into another register;

buffering in the initialization data into the memory without caching; and loading a basic input output system into the memory after transferring of the initialization data is complete.

9. A system comprising:

a processor; and a memory coupled to the processor;

a storage device coupled to the processor, said storage device storing instructions that enable the processor to:

reconfigure said memory from a first configuration to a second configuration to receive a pattern;

buffer the pattern in one or more data blocks;

store the one or more data blocks in the memory; and restore the memory to the first configuration; and a system firmware program to:

reconfigure said memory to the second configuration that enables write combining;

selectively clear said memory by storing the pattern in the memory; and load a basic input output system into a designated region of the memory after restoring the memory to the first configuration, wherein said basic input output system converts the memory from the first configuration to the second configuration in response to an initialization to boot said system.

10. The system of claim 9, wherein said processor comprises:

at least one register associated with the memory; and one or more caches.

11. The system of claim 10, wherein said processor further includes:

at least one buffer to enable said system firmware program to:

flush and disable the one or more caches associated with the memory;

program the at least one register associated with the memory to include memory type information that declares said memory as a write combining type memory; and modify the memory type information to change the memory from the second configuration in the first configuration after storing the pattern into the memory.

12. The system of claim 11, wherein the memory as the write combining type memory to allow speculative reads with weak ordering of the one or more data blocks.

13. A system comprising:

a processor;

a memory coupled to the processor;

a store device coupled to the processor, said storage device storing instructions that enable the processor to:

reconfigure said memory from a first configuration to a second configuration to receive a pattern;

buffer the pattern in one or more data blocks;

store the one or more data blocks in the memory; and restore the memory to the first configuration;

a system firmware program to:

reconfigure said memory to the second configuration that enables write combining;

selectively clear said memory by storing the pattern in the memory; and load a basic input output system into a designated region of the memory after restoring the memory to the first configuration, wherein said processor comprises at least one register associated with the memory; and one or more caches; and a bus that carries data across a fixed bus width to provide the one or more data blocks over the bus, said one or more data blocks are sized to match the fixed bus width, wherein the one or more data blocks includes quad-sized words to transfer said pattern in 64-bit data units over the bus.

14. A system comprising:

a processor; and a memory coupled to the processor;

a storage device coupled to the processor, said storage device storing instructions that enable the processor to:

reconfigure said memory from a first configuration to a second configuration to receive a pattern;

buffer the pattern in one or more data blocks;

store the one or more data blocks in the memory; and restore the memory to the first configuration;

reconfigure said memory to the second configuration that enables write combining;

selectively clear said memory by storing the pattern in the memory; and load said a basic input output system into a designated region of the memory after restoring the memory to the first configuration, wherein said processor comprises:

at least one register associated with the memory; and one or more caches, wherein said processor further includes:

at least one buffer to enable said system firmware program to:

flush and disable the one or more caches associated with the memory;

program the at least one register associated with the memory to include memory type information that declares said memory as a write combining type memory; and modify the memory type information to change the memory from the second configuration in the first configuration after storing the pattern into the memory, wherein the memory as the write combining type memory to allow speculative reads with weak ordering of the one or more data blocks, and, wherein said basic input output system to:

initiate a booting sequence that copies at least in part the memory type information from the at least one register into another register; and load the pattern in the memory without caching the one or more data blocks.

15. A system comprising:

a processor; and a memory coupled to the processor; and a storage device coupled to the processor, said storage device storing instructions that enable the processor to:

configure a memory to be a write combining type memory;

transfer initialization data to said memory; and reconfigure the memory from the write combining type memory to a non-write combining type memory;

wherein said storage device further storing instructions that enables the processor to:

initiate a booting sequence that copies at least in part the memory type and range information from at least one register into another register;

buffer in the initialization data into the memory without caching; and load a basic input output system into the memory after transferring of the initialization data is complete.

16. An article comprising a medium storing instructions that enable a processor-based system to:

reconfigure a memory from a first configuration to a second configuration to receive a pattern;

buffer the pattern in one or more data blocks;

store the one or more data blocks in the memory;

restore the memory to the first configuration; and convert the memory from the first configuration to the second configuration in response to an initialization to boot a processor-based system.

17. The article of claim 16, further storing instructions that enable the processor-based system to:

reconfigure said memory to the second configuration that enables write combining;

selectively clear said memory by storing the pattern in the memory; and load a system firmware program into a designated region of the memory after restoring the memory to the first configuration.

18. The article of claim 17, further storing instructions that enable the processor-based system to:

flush and disable one or more caches associated with the memory; and program at least one register associated with the memory to include memory type information that declares said memory as a write combining type memory.

19. The article of claim 18, further storing instructions that enable the processor-based system to modify the memory type information to change the memory from the second configuration in the first configuration after storing the pattern into the memory.

20. An article comprising a medium storing instructions that enable a processor-based system to:

reconfigure a memory from a first configuration to a second configuration to receive a pattern;

buffer the pattern in one or more data blocks;

store the one or more data blocks in the memory;

restore the memory to the first configuration;

reconfigure said memory to the second configuration that enables write combining;

selectively clear said memory by storing the pattern in the memory; and load a system firmware program into a designated region of the memory after restoring the memory to the first configuration;

flush and disable one or more caches associated with the memory;

program at least one register associated with the memory to include memory type information that declares said memory as a write combining type memory; and provide the one or more data blocks over a bus that carries data across a fixed bus width, said one or more data blocks are sized to match the fixed bus width wherein the one or more data blocks includes quad-sized words to transfer said pattern in 64-bit data units over the bus.

21. The article of claim 20, further storing instructions that enable the processor-based system to define the memory as the write combining type memory to allow speculative reads with weak ordering of the one or more data blocks.

22. An article comprising a medium storing instructions that enable a processor-based system to:

reconfigure a memory from a first configuration to a second configuration to receive a pattern;

buffer the pattern in one or more data blocks;

store the one or more data blocks in the memory;

restore the memory to the first configuration;

reconfigure said memory to the second configuration that enables write combining;

selectively clear said memory by storing the pattern in the memory; and load a system firmware program into a designated region of the memory after restoring the memory to the first configuration;

flush and disable one or more caches associated with the memory;

program at least one register associated with the memory to include memory type information that declares said memory as a write combining type memory;

modify the memory type information to change the memory from the second configuration in the first configuration after storing the pattern into the memory;

initiate a booting sequence that copies at least in part the memory type information from the at least one register into another register;

load the pattern in the memory without caching the one or more data blocks; and load a basic input output system into the memory.

23. An article comprising a medium storing instructions that enable a processor-based system to:

configure a memory to be a write combining type memory;

transfer initialization data to said memory;

reconfigure the memory from the write combining type memory to a non-write combining type memory;

initiate a booting sequence that copies at least in part the memory type and range information from at least one register into another register;

buffer in the initialization data into the memory without caching; and load a basic input output system into the memory after transferring of the initialization data is complete.

* * * * *

UNITED STATES PATENT AND TRADEMARK OFFICE

CERTIFICATE OF CORRECTION

PATENT NO. : 6,938,127 B2
DATED : August 30, 2005
INVENTOR(S) : Fletcher et al.

It is certified that error appears in the above-identified patent and that said Letters Patent is hereby corrected as shown below:

Column 12,
Line 55, delete "store" and insert -- strorage --.

Signed and Sealed this

Twenty-second Day of November, 2005

JON W. DUDAS
*Director of the United States Patent and Trademark Office*